(12) United States Patent
Dupont (10) Patent No.: US 8,544,596 B2
(45) Date of Patent: Oct. 1, 2013

(54) ENCLOSURE FOR THERMAL EQUIPMENT AND METHOD OF CONSTRUCTION

(75) Inventor: Denis Dupont, Belfort (FR)

(73) Assignee: GE Energy Products France SNC, Belfort (FR)

(*) Notice: Subject to any disclaimer, the term of this patent is extended or adjusted under 35 U.S.C. 154(b) by 0 days.

(21) Appl. No.: 13/331,608

(22) Filed: Dec. 20, 2011

(65) Prior Publication Data

US 2012/0318608 A1 Dec. 20, 2012

(30) Foreign Application Priority Data

Dec. 23, 2010 (FR) ...................................... 10 61172

(51) Int. Cl.
*B64F 1/26* (2006.01)
(52) U.S. Cl.
USPC ............ 181/203; 181/210; 181/292; 181/290
(58) Field of Classification Search
USPC .................................. 181/203, 210, 292, 290
See application file for complete search history.

(56) References Cited

U.S. PATENT DOCUMENTS

| 2,927,665 | A | * | 3/1960 | Hauf ................................ 52/262 |
| 3,791,682 | A | | 2/1974 | Mitchell |
| 4,007,388 | A | | 2/1977 | Lawyer et al. |
| 7,604,095 | B2 | * | 10/2009 | Mitchell ........................ 181/290 |
| 7,913,813 | B1 | * | 3/2011 | Mathur ......................... 181/290 |
| 7,938,224 | B2 | * | 5/2011 | Frustie et al. ................. 181/214 |
| 7,946,385 | B2 | * | 5/2011 | Lalane et al. ................. 181/296 |
| 2004/0040313 | A1 | | 3/2004 | Kurokawa et al. |
| 2007/0152126 | A1 | | 7/2007 | Graham et al. |

FOREIGN PATENT DOCUMENTS

| FR | 2 398 888 A1 | 2/1979 |
| GB | 2 148 398 A | 5/1985 |
| JP | 2006 105052 A | 4/2006 |

OTHER PUBLICATIONS

EPO Form 1503, FR, Jul. 7, 2011, Search Report for FR 1061172.

* cited by examiner

*Primary Examiner* — Forrest M Phillips
(74) *Attorney, Agent, or Firm* — Edwards Wildman Palmer LLP; Steven M. Jensen; Brian R. Landry (57) ABSTRACT

The invention provides an enclosure, in particular, an acoustic enclosure, for thermal equipment, for example a gas turbine or a gas turbine auxiliary module. The invention also provides a method of constructing such an enclosure.

11 Claims, 6 Drawing Sheets

ENCLOSURE FOR THERMAL EQUIPMENT AND METHOD OF CONSTRUCTION

RELATED APPLICATION

This application claims priority to French application Ser. No. FR 10 61172, filed Dec. 23, 2010, the entire disclosure of which is incorporated herein by this reference The present invention relates to thermal equipment, notably gas turbines and gas turbine auxiliary modules. In particular, the present invention relates to an enclosure, particularly an acoustic enclosure, for thermal equipment.

Thermal equipment, and more specifically gas turbines, comprise several auxiliary modules that are necessary for their operation. Thus, a gas turbine may comprise a module for the gas, to regulate the pressure and the temperature of the gaseous fuel supplied to the gas turbine, a module for the water, allowing water to be injected into the combustion chamber of the turbine in order to reduce nitrogen oxide $NO_x$ emissions, an auxiliaries equipment module containing the systems needed particularly for starting the gas turbine, lubricating it, etc.

The modules are installed near the gas turbine so as to limit the length of piping and improve the on-site installation of the gas turbine components.

The modules generally comprise an enclosure to protect the components of the module from the external surroundings (dust, moisture, etc.), for the acoustic attenuation of the noise generated by the said components and for protecting anybody in the vicinity of the components in the event of malfunction, for example in the event of a fire or an explosion. However, the design of the enclosure has also to make for ease of construction and has to plan for maintenance operations on the module, with easy access to the components.

Enclosures for thermal equipment are already known, particularly from documents US 2010/0163705, US 2009/0049842, CN 2009/65136U, JP 2006/105052 and U.S. Pat. No. 4,007,388.

Enclosures for thermal equipment are thus either mounted on the base of the thermal equipment (on-base enclosures), or mounted on separate foundations surrounding the thermal equipment (off-base enclosures).

On-base enclosures are installed at the periphery of the base of the thermal equipment. They are therefore of relatively small volume and do not require a large amount of extinguishant in order to afford protection against fire. In addition, they do not require any additional foundations. However, on-base enclosures do not make it easy for maintenance personnel to move around the thermal equipment in order to carry out maintenance operations. Thus, a great many doors have to be added to the facades of the enclosure in order to improve access to the thermal equipment, to the detriment of the acoustic performance, and the panels surrounding the thermal equipment have also to be readily removable so as to allow maintenance work to be carried out under good conditions. In addition, the base of the thermal equipment is not acoustically insulated by the enclosure, and this reduces the overall acoustic performance.

Off-base enclosures are installed around the thermal equipment: their width is great and generally exceeds that permitted for transporting thermal equipment. They thus offer enough space around the thermal equipment for maintenance operations to be carried out, and therefore do not require numerous doors. However, the volume of off-base enclosures is great, and they require a great quantity of extinguishant to afford fire protection, greater ventilation, and carry an increased risk of stagnant ventilation zones inside the enclosure. What is more, off-base enclosures comprise a great many component parts that have to be assembled on site, thus increasing construction times, and they need foundations in addition to those of the thermal equipment.

It is an object of the present invention to solve the above-mentioned problems. In particular, it is an object of the present invention to offer an enclosure which allows maintenance operations on the thermal equipment to be carried out easily while at the same time maintaining a limited volume and a low number of components. Another object of the present invention is also to offer an easy method for constructing such an acoustic chamber that also affords at least partial protection to the thermal equipment while it is being transported to the construction site.

One aspect of the invention proposes an enclosure, particularly an acoustic enclosure, for thermal equipment, for example a gas turbine or a gas turbine auxiliary module, the said thermal equipment being mounted on a base, comprising:
 a metal structure, particularly a vertical structure, comprising lateral faces able at least partially to surround the said thermal equipment, and
 a chamber comprising an internal face, preferably at least partially open.

The metal structure can be mounted on the base of the said thermal equipment and the said chamber is mounted, via its internal face, on at least one of the lateral faces of the metal structure, and the said chamber is able to extend laterally beyond the base of the said thermal equipment. In other words, the chamber is mounted, via its internal face, on at least one of the lateral faces of the metal structure and may extend laterally beyond the base of the said thermal equipment.

The chamber is able to accommodate people in order in particular to allow maintenance operations. In other words, people, such as technicians, can enter and/or move around in the chamber notably with a view to performing an intervention on the thermal equipment and carrying out maintenance operations.

The chamber may also comprise an external face, preferably at least partially closed.

The chamber may be defined by its internal face, its external face, its upper face and its lower face. The various faces of the chamber define a volume in which technicians can move around and which may extend beyond the base of the thermal equipment protected by the enclosure.

Thus, the enclosure makes it possible to create a space for maintenance operations, while still being mounted on the base of the thermal equipment. Moreover, the enclosure defines an optimized volume around the thermal equipment only, rather than around the thermal equipment and its base. This then reduces the amount of extinguishant that has to be provided, and the risk of stagnant zones inside the enclosure.

Finally, the bulkiest part of the enclosure is the metal structure, which is of dimensions substantially equal to the largest dimensions of the thermal equipment (longest length, greatest width and tallest height). The metal structure can therefore be transported using the same facilities as the thermal equipment itself, thus making the enclosure easier to transport.

According to one embodiment, the metal structure comprises lateral faces able to surround the said thermal equipment, and the chamber is a circular chamber comprising a circular internal face, preferably at least partially open. The circular chamber is mounted, via its internal face, on the lateral faces of the metal structure. The circular chamber may also comprise a circular external face, preferably at least partially closed.

What is meant by a circular chamber or by a chamber that has a closed contour, is a volume which when circumnavigated brings one back to the starting point. The circular chamber is therefore a volume based on a closed contour, which means to say a volume surrounding an empty central part. The circular chamber is therefore not restricted to a torus shape but may be in the form of a rectangular corridor that joins up on itself.

It is therefore possible to access all four sides of the thermal equipment in order to perform maintenance operations thereon. However, when the thermal equipment is assembled with one or more other thermal equipments via at least one of its sides, then the chamber is preferably not circular and is mounted via its internal face on one or more free lateral faces of the metal structure.

The enclosure may also comprise an upper wall and the metal structure may comprise an upper face on which the upper wall is mounted. The upper wall may then be transported with the thermal equipment itself, making the enclosure easier to transport.

The chamber, which is for example circular, may also comprise a lower face and an upper face that are at least partially closed.

The external face of the chamber, which is for example circular, may have one or more doors.

Advantageously, the enclosure also comprises a circular wall mounted under the chamber, preferably circular, and able laterally to surround the base of said thermal equipment. The circular wall isolates the base of the thermal equipment independently of the thermal equipment itself. Specifically, the wall is mounted under the chamber, preferably circular, and is separated therefrom by the lower face of the circular chamber. Thus, thanks to the circular wall, it is possible to attenuate noise pollution caused by the base while keeping the same volume surrounding the thermal equipment.

Advantageously, the metal structure has a rectangular shape and the circular chamber comprises four extensions, or parts, which in pairs are the same width and parallel. It is thus possible for the enclosure to be transported and constructed easily, thanks to the dimensions of the various elements which are smaller than or substantially the same as those of the thermal equipment.

Another aspect of the invention proposes a device comprising a thermal equipment mounted on a base and an enclosure as defined hereinabove.

Another aspect of the invention also proposes a method for constructing an enclosure as described hereinabove. According to the method, the metal structure is fixed on the base of the thermal equipment and extensions are fixed on the metal structure to form the, for example circular, chamber on the metal structure.

Advantageously, the enclosure comprises a metal structure of rectangular shape and a circular chamber with four extensions, or parts, which in pairs are of the same width and parallel, and possibly an upper wall, and according to the method:

the metal structure is fixed on the base of the said thermal equipment, with the said thermal equipment, if present the upper wall is mounted on the upper face of the metal structure, and the like-width extensions of the circular chamber are assembled in pairs via their internal face so that they can be transported to the construction site, then the four extensions of the circular chamber are disconnected and fixed to the metal structure.

The enclosure of the thermal equipment can thus be transported and constructed easily. In particular, the number of components to be assembled on site, which means to say the construction time, is reduced, as is the volume of the various elements of the enclosure. In particular, the metal structure of the enclosure, which is bulky, and the upper wall are transported at the same time as the thermal equipment, the metal structure being used as protection during transport and also allowing a protective tarpaulin to be secured around the thermal equipment.

Advantageously, a circular wall is also mounted under the, preferably circular, chamber around the base of the said thermal equipment.

Other advantages and features of the invention will become apparent from studying the detailed description of one non-limiting embodiment of the invention, and the attached drawings in which.

Figure 1:
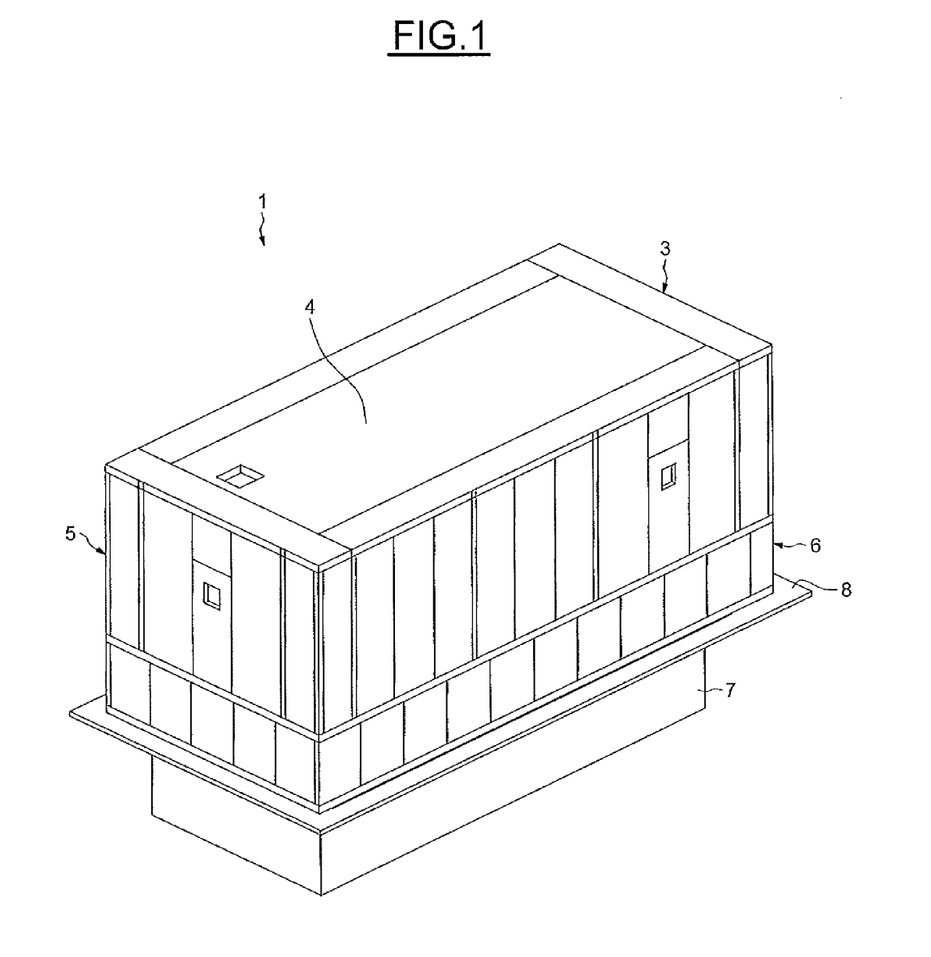
FIG. 1 schematically depicts a device comprising thermal equipment and an enclosure.

FIG. 1 schematically depicts a device 1 comprising thermal equipment 2 (see FIG. 2) and an enclosure 3. The enclosure 3 comprises an upper wall 4, a circular chamber 5 and a circular wall 6. The upper wall 4 and the circular chamber 5 are positioned above the base 9 (see FIG. 2) of the thermal equipment and the circular wall 6 is mounted on a slab 8 poured around the foundations 7 of the thermal equipment. The enclosure 3 provides acoustic insulation and protection between the thermal equipment 2 and the outside of the enclosure. The enclosure 3 also allows people easily to access the thermal equipment 2 from outside, so that they can perform maintenance operations thereon.

Figure 2:
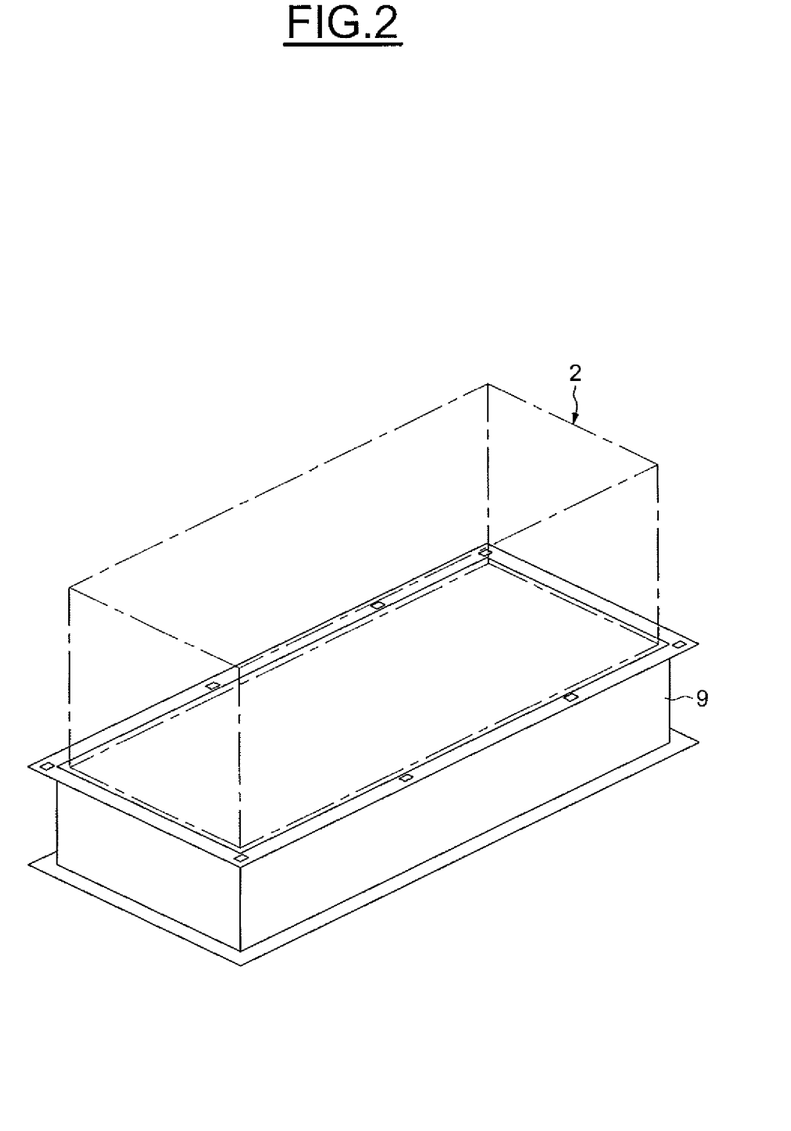
FIG. 2 schematically illustrates thermal equipment with its base before the enclosure is constructed.

FIG. 2 schematically depicts the thermal equipment 2 and its base 9. The base 9 makes the thermal equipment 2 easier to transport and to install on site. In particular, the base 9 and the thermal equipment 2 are intended to be set down on the foundations 7 provided for that purpose. Within the context of the present description, the thermal equipment may, for example, be a gas turbine or alternatively may be a gas turbine auxiliary module. To simplify matters, FIG. 2 depicts the external envelope dimensions of the thermal equipment 2.

Figure 3:
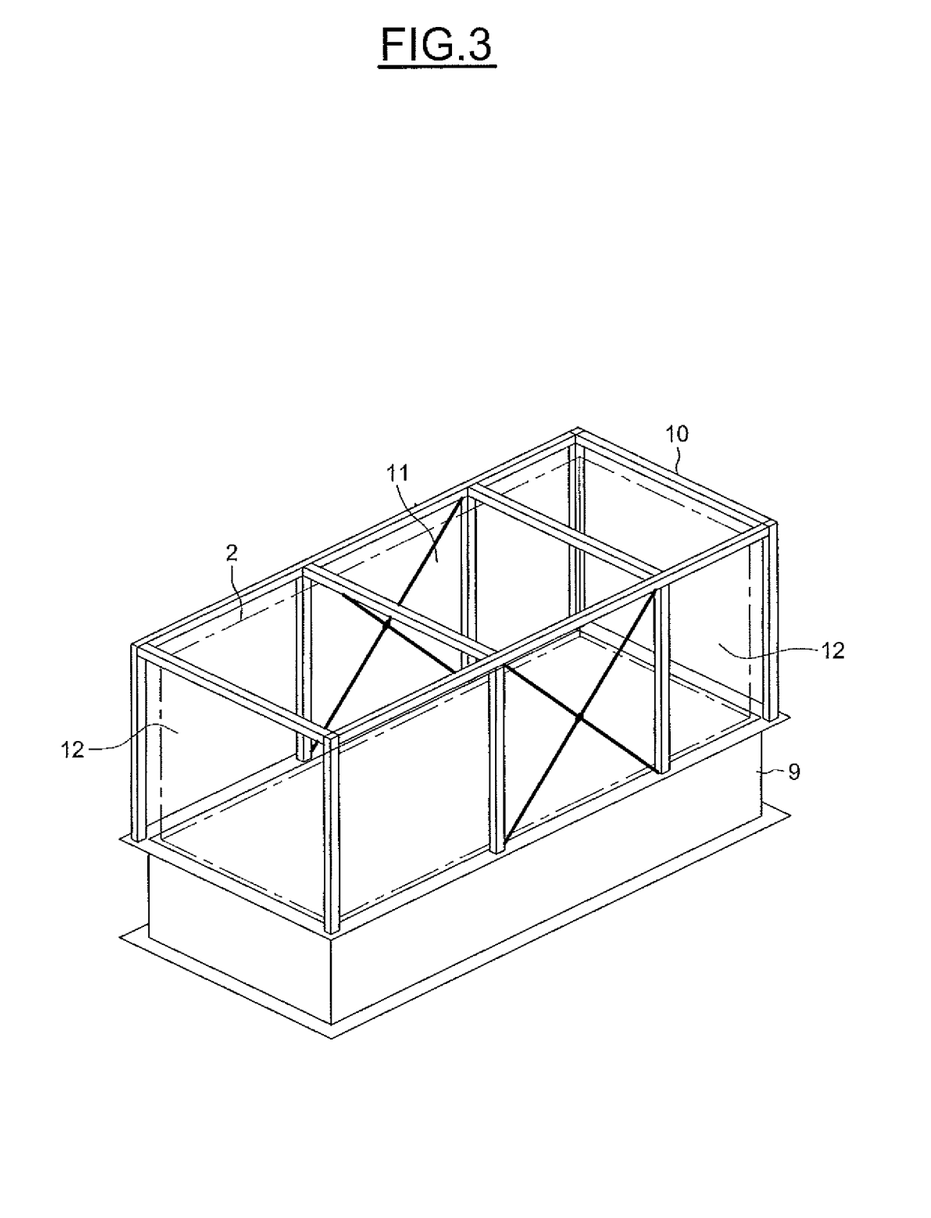
FIG. 3 schematically illustrates the thermal equipment on its base, with the metal structure.

FIG. 3 depicts the first step of constructing the enclosure 3 around the thermal equipment 2. A metal structure 10 is mounted on the base 9, particularly at the periphery of the upper surface of the base 9. The metal structure 10 comprises an open upper face 11, and surrounds the thermal equipment 2 via open lateral faces 12. The metal structure 10 is able to support the upper wall 4 and the circular chamber 5.

Figure 4:
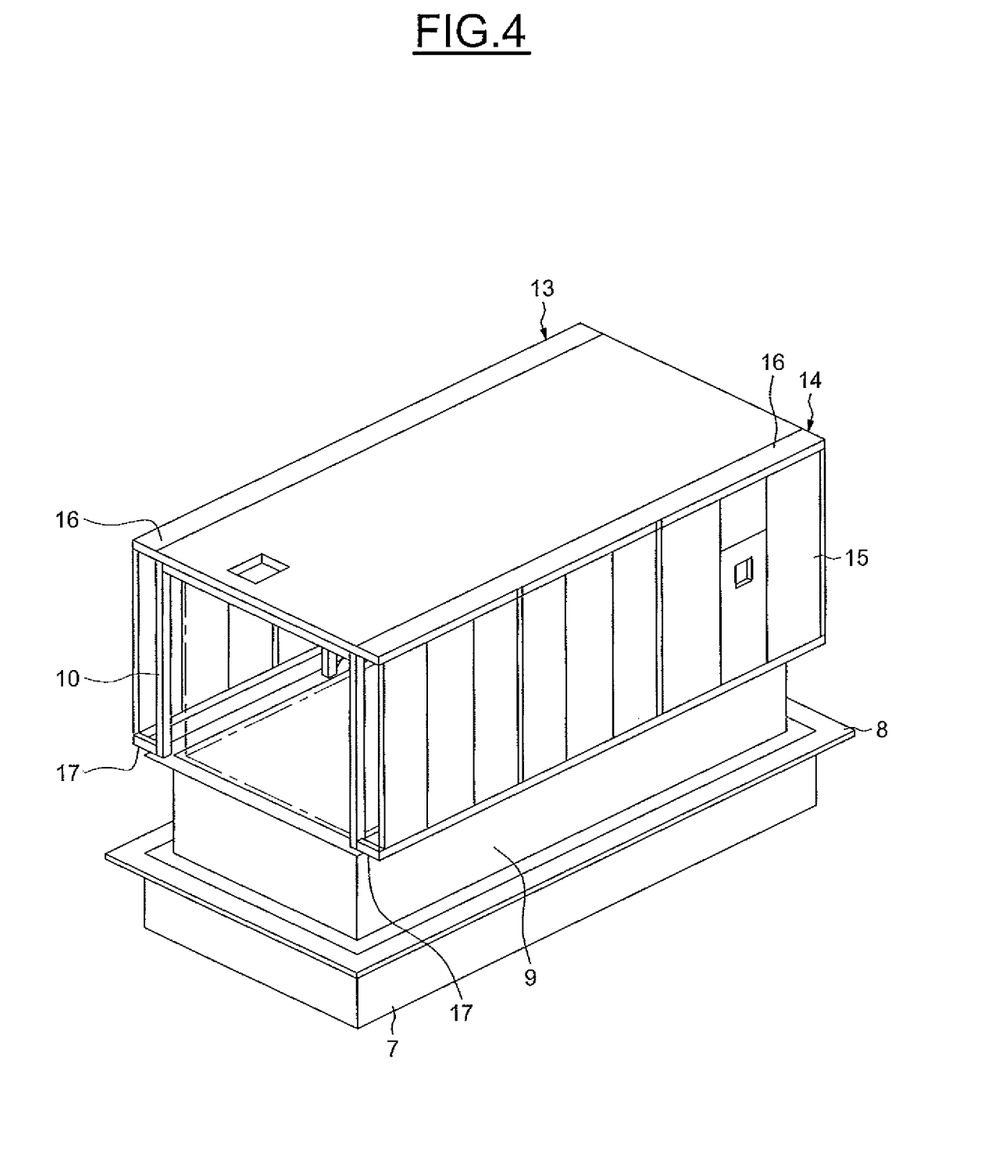
FIG. 4 schematically illustrates the thermal equipment on its base, with the metal structure, the upper wall and two extensions of the circular chamber.

FIG. 4 depicts the thermal equipment 2 and its base 9 on the foundations 7. The slab 8 has been poured around the foundations 7 in order notably to allow the circular wall 6 to be constructed. Moreover, the upper wall 4 is mounted on the upper face 11 of the metal structure, to protect the thermal equipment against rain or objects falling on the thermal equipment.

For the remainder of the description it will be assumed that the metal structure is of rectangular shape, and that the circular chamber 5 comprises four extensions, or parts, corresponding to the four sides of a rectangle.

Two extensions 13, 14 of the circular chamber 5 are mounted on the metal structure 10. The extensions 13, 14 are lateral extensions fixed, via their internal face, on the metal structure 10. More specifically, the extensions 13, 14 are fixed to two opposite lateral faces 12 of the metal structure 10 and extend laterally out beyond the base 9 of the thermal equipment 2. The extensions 13, 14 comprise an external face that is at least partially closed by acoustic panels 15, an upper face 16 and a lower face 17.

Figure 5:
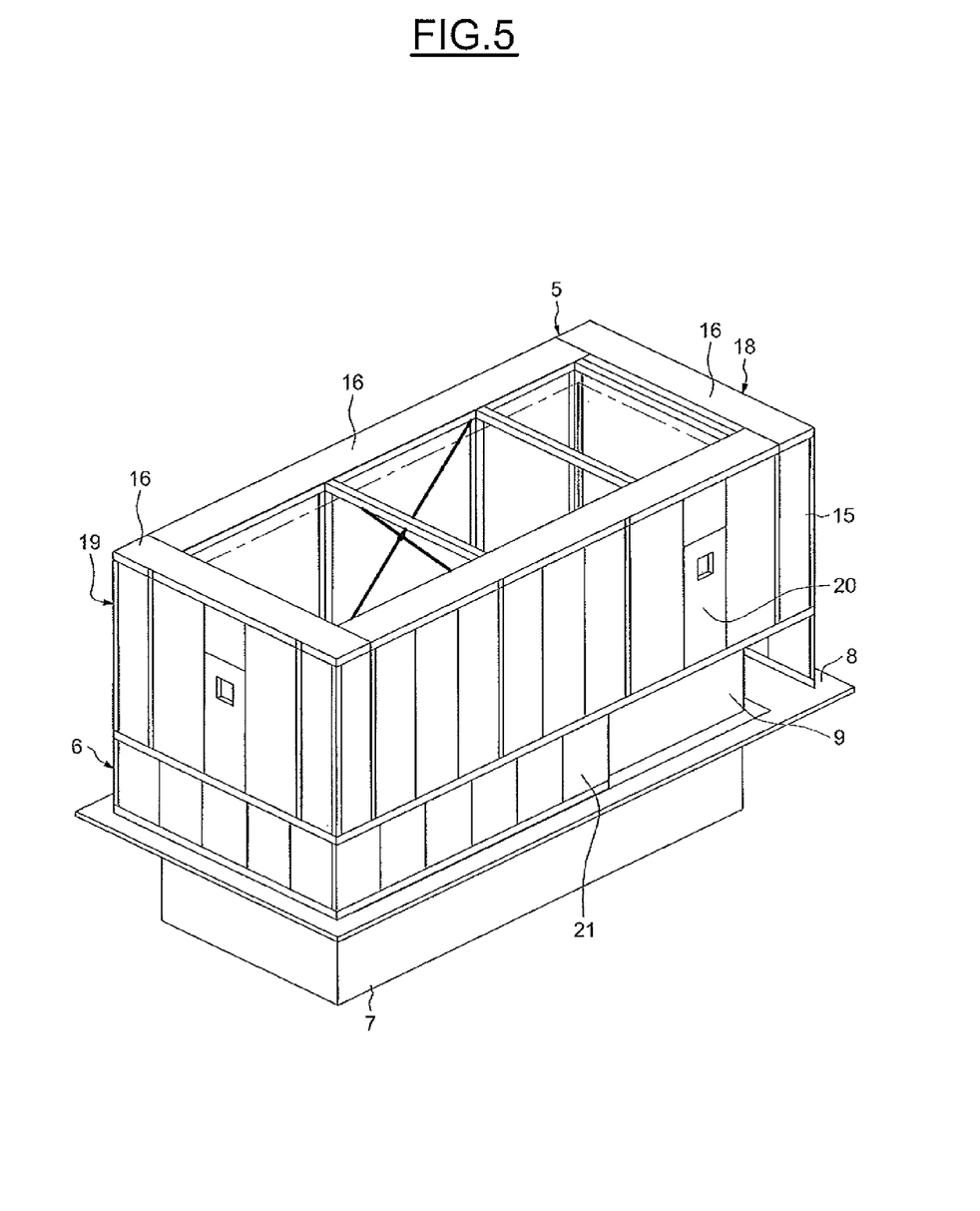
FIG. 5 schematically illustrates the thermal equipment on its base, with the metal structure, the circular chamber and part of the circular wall, FIG. 6 schematically illustrates two extensions of the circular chamber which have been assembled via their internal face for transport, and FIG. 7 schematically illustrates the two other extensions of the circular chamber which have been assembled via their internal face for transport.

In FIG. 5, two additional extensions 18 and 19 of the circular chamber 5 have been mounted on the metal structure 10. The extensions 18 and 19 are lateral extensions fixed by their internal face to the metal structure 10. More specifically, the extensions 18, 19 are fixed to the two remaining opposing lateral faces 12 of the metal structure 10 and extend laterally out beyond the base 9 of the thermal equipment 2. The extensions 18, 19 comprise an external face that is at least partially closed by acoustic panels 15, an upper face 16 and a lower face 17. The four extensions 13, 14, 18 and 19 thus define the circular chamber 5. The circular chamber 5 thus has an interior volume left free to accommodate the thermal equipment 2 and delimited by an internal face via which the circular chamber 5 is fixed to the lateral faces 12 of the metal structure 10. Moreover, the circular chamber 5 extends laterally out beyond the base 9 and has a lower face 17 and an upper face 16. The circular chamber 5 also has an external face comprising insulating panels 15 and one or more doors 20.

The enclosure 3 also comprises a circular wall 6, mounted between the circular chamber 5 and the slab 8 poured around the foundations 7 of the thermal equipment. Thus, the circular wall 6 surrounds the base 9 of the thermal equipment, which may be the seat of noise pollution. The circular wall 6 also comprises acoustic panels 21 that can be taken off in order to access the base 9 if appropriate. The volume of air contained between the base 9 and the circular wall 6 is notably separated from the volume contained between the thermal equipment 2 and the circular chamber 5 by the lower face 17 of the circular chamber 5. This then limits the amount of extinguishant that needs to be provided for the volume contained between the thermal equipment 2 and the circular chamber 5.

Thanks to the thickness of the circular chamber 5 which extends laterally beyond the base 9, the people working on the thermal equipment can easily access and move around the thermal equipment 2 without being impeded by the enclosure 3. Quite the opposite: the people can move around in the circular chamber 5 level with the thermal equipment 2 because the lower face 17 of the circular chamber is substantially at the same height as the upper surface of the base 9. In addition, the circular chamber 5 does not require separate foundations from those of the thermal equipment 2 and can easily be constructed on site.

In particular, when the thermal equipment is being transported onto and installed on a given site, the thermal equipment 2 and its base 9 can be transported and delivered with the metal structure 10 and the upper wall 4 of the enclosure. This then limits the volume required for transporting the enclosure, by using the volume already occupied by the thermal equipment, and the metal structure and possibly the top wall of the constructed enclosure are all supplied directly, thus reducing the time to construct the enclosure on site. Moreover, the metal structure 10 and the upper wall 4 are also able to protect the thermal equipment during transport. Panels or tarpaulins to be attached to the metal structure 10 to close the lateral faces 12 of the metal structure 10 may also possibly be provided.

Figure 6:
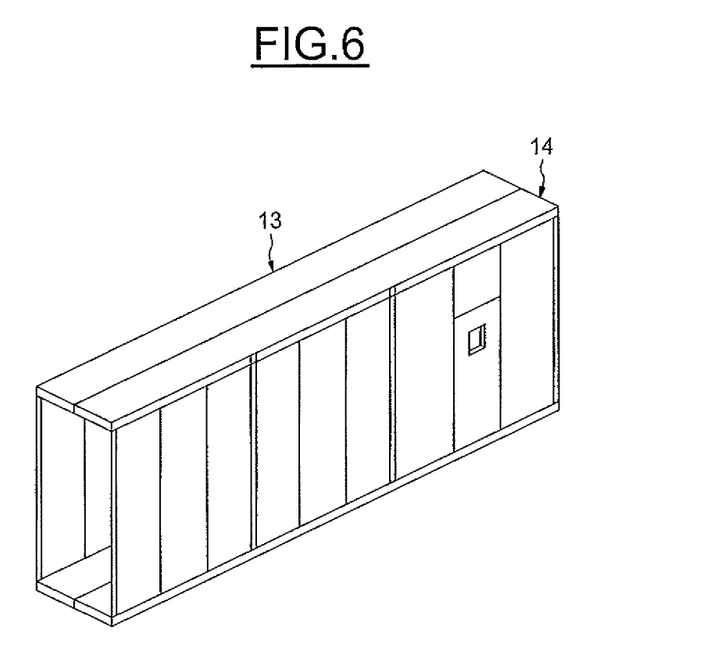
Figure 7:
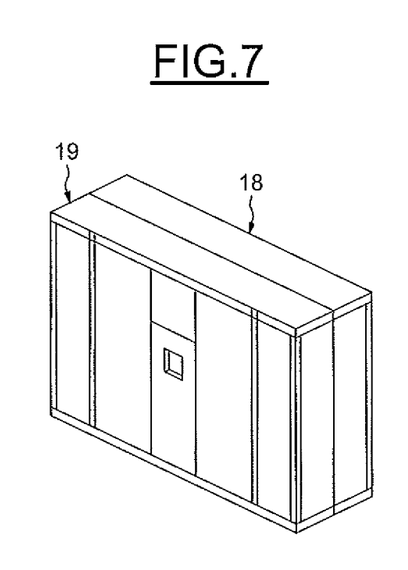

Moreover, the extensions 13, 14, 18 and 19 of the enclosure may also be delivered, thereby minimizing the volume needed for transporting them. Thus, and as depicted in FIGS. 6 and 7, the extensions 13 and 14, which have the same width, and the extensions 18 and 19, which are likewise of like width, can be assembled in pairs via their internal face so that they occupy a small volume during transport, while at the same time maintaining impact resistance to the knocks they may suffer during transport. Additional equipment, for example the panels of the circular wall or the ventilation system, may also be transported in the face-to-face extensions. Finally, once they have been conveyed onto site, constructing the enclosure 3 entails no more than attaching the said extensions 13, 14, 18 and 19 to the four lateral sides of the metal structure 10. Because the metal structure and the various extensions of the circular chamber 5 have been preassembled at the factory, before being transported onto site, the time taken to construct and install the thermal equipment and its enclosure on site is reduced.

It is therefore possible to complete the enclosure by also constructing a circular wall 6 between the slab 8 poured around the foundations 7 and the circular chamber 5, if the base 9 of the thermal equipment is likely to be the seat of noise pollution. Moreover, openings may also be provided, for example in the upper wall 4 or in the panels 15, for the enclosure ventilation system (to avoid stagnant zones) and/or for conveying or removing the various fluids between the thermal equipment and the outside (fuels, exhaust gases).

The invention is not restricted to an enclosure comprising a circular chamber as described hereinabove, but relates also to the case where the enclosure comprises a non-circular chamber. Such may be the case for example when the thermal equipment is assembled with a second piece of thermal equipment (for example another piece of driven thermal equipment) via one of its sides. In such an instance just one of the two extensions 18 or 19 of the chamber 5 is mounted on the lateral face of the metal structure 10, or more precisely is mounted on the opposite lateral face to the side on which the second thermal equipment is situated. Moreover, when the thermal equipment is assembled with two other items of thermal equipment via two opposite lateral faces, then just the extensions 13 and 14 of the enclosure are mounted on the metal structure, as illustrated in FIG. 4.

This then yields an enclosure that is readily transportable and easy to construct, allowing maintenance operations to be performed easily on the thermal equipment while at the same time maintaining a limited protective volume around the thermal equipment.

The invention claimed is:

1. An enclosure for thermal equipment, the thermal equipment being mounted on a base, comprising:
   a metal structure comprising lateral faces able at least partially to surround the thermal equipment, and
   a chamber comprising at least one internal face, and external face, an upper face, and a lower face,
   characterized in that:
   the metal structure can be mounted on the base of the thermal equipment,
   the chamber is mounted, via its internal face, on at least one of the lateral faces of the metal structure, and
   the chamber is able to extend laterally beyond the base of the thermal equipment, from the internal face to the external face, allowing technicians to move around in the chamber in order to perform an intervention on the thermal equipment.

2. The enclosure according to claim 1, also comprising an upper wall and in which the metal structure comprises an upper face on which the upper wall is mounted.

3. The enclosure according to claim 1, wherein the lower face and the upper face are at least partially closed.

4. The enclosure according to claim 1, wherein the external face is at least partially closed has one or more doors.

5. A device comprising thermal equipment mounted on a base, and an enclosure according to claim 1.

6. A method of constructing an enclosure according claim 1, in which method the metal structure is fixed on the base of the thermal equipment, and the chamber is fixed on the metal structure.

7. The enclosure according to claim 1, which is an acoustic enclosure.

8. The device according to claim 5, wherein the enclosure is an acoustic enclosure.

9. The method according to claim 6, wherein the enclosure is an acoustic enclosure.

10. The device according to claim 5, wherein the thermal equipment is selected from the group consisting of: a gas turbine and a gas turbine auxiliary module.

11. The method according to claim 6, wherein the thermal equipment is selected from the group consisting of: a gas turbine and a gas turbine auxiliary module.

\* \* \* \* \*